(12) United States Patent
Okamura et al.

(10) Patent No.: US 12,081,330 B2
(45) Date of Patent: Sep. 3, 2024

(54) TERMINAL AND RADIO COMMUNICATION METHOD

(71) Applicant: NTT DOCOMO, INC., Tokyo (JP)

(72) Inventors: Masaya Okamura, Tokyo (JP); Yuki Matsumura, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 345 days.

(21) Appl. No.: 17/596,557

(22) PCT Filed: Jun. 14, 2019

(86) PCT No.: PCT/JP2019/023773
§ 371 (c)(1),
(2) Date: Dec. 13, 2021

(87) PCT Pub. No.: WO2020/250450
PCT Pub. Date: Dec. 17, 2020

(65) Prior Publication Data
US 2022/0271863 A1   Aug. 25, 2022

(51) Int. Cl.
*H04L 25/02*   (2006.01)
*H04L 1/00*   (2006.01)
(Continued)

(52) U.S. Cl.
CPC .......... *H04L 1/0025* (2013.01); *H04L 5/0051* (2013.01); *H04W 72/0473* (2013.01); *H04W 72/23* (2023.01); *H04W 76/30* (2018.02)

(58) Field of Classification Search
CPC ....... H04W 8/24; H04W 72/04; H04W 72/14; H04W 80/08
See application file for complete search history.

(56) References Cited

U.S. PATENT DOCUMENTS

2018/0310257 A1\* 10/2018 Papasakellariou .. H04W 52/367
2020/0267661 A1\* 8/2020 Park ...................... H04W 76/27
(Continued)

FOREIGN PATENT DOCUMENTS

WO   2018-182381 A1   10/2018

OTHER PUBLICATIONS

Vivo; "Outcome of offline discussion on Full TX Power UL transmission"; 3GPP TSG RAN WG1#97, R1-1907886; Reno, USA; May 13-17, 2019 (1 page).
(Continued)

*Primary Examiner* — Jung Liu
(74) *Attorney, Agent, or Firm* — Osha Bergman Watanabe & Burton LLP

(57) ABSTRACT

A terminal according to one aspect of the present disclosure includes: a receiving section that receives configuration information of a Sounding Reference Signal (SRS) resource set including three or more SRS resources having different numbers of SRS ports; and a control section that determines one SRS resource from the three or more SRS resources based on an SRS Resource Index (SRI) field included in downlink control information and having a same size as a size of an SRI field of 3GPP Release 15 New Radio. According to one aspect of the present disclosure, it is possible to appropriately control full power transmission.

6 Claims, 13 Drawing Sheets

(51) Int. Cl.
    *H04L 5/00*       (2006.01)
    *H04W 72/044*    (2023.01)
    *H04W 72/23*     (2023.01)
    *H04W 76/30*     (2018.01)

(56) References Cited

U.S. PATENT DOCUMENTS

| | | | |
|---|---|---|---|
| 2020/0287602 A1 | 9/2020 | Park et al. | |
| 2021/0281448 A1* | 9/2021 | Li | H04L 5/0051 |
| 2021/0352596 A1* | 11/2021 | Liu | H04W 52/367 |
| 2022/0123799 A1* | 4/2022 | Varatharaajan | H04L 5/0048 |
| 2022/0224567 A1* | 7/2022 | Zhang | H04B 7/0456 |

OTHER PUBLICATIONS

Office Action issued in Japanese Application No. 2021-525893 dated Mar. 22, 2023 (11 pages).
International Search Report issued in PCT/JP2019/023773 on Nov. 26, 2019 (2 pages).
Written Opinion of the International Searching Authority issued in PCT/JP2019/023773 on Nov. 26, 2019 (4 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

* cited by examiner

| Nini | SRI=0 | SRI=1 |
|---|---|---|
| 1 | nrofSRS-Ports = 2 | nrofSRS-Ports = 4 |
| 2 | nrofSRS-Ports = 1 | nrofSRS-Ports = 4 |
| 4 | nrofSRS-Ports = 1 | nrofSRS-Ports = 2 |

| | | |
|---|---|---|
| R | Serving Cell ID | BWP ID |
| R | SRS RESOURCE ID | |
| R | SRS RESOURCE ID | |

FIG. 5B

| SRS RESOURCE ID | CONFIGURED SRS RESOURCE (IN SRS RESOURCE SET OF USAGE = 'codebook') |
|---|---|
| 0 | SRS RESOURCE CONFIGURED TO nrofSRS-Ports = 1 |
| 1 | SRS RESOURCE CONFIGURED TO nrofSRS-Ports = 2 |
| 2 | SRS RESOURCE CONFIGURED TO nrofSRS-Ports = 4 |
| 3 | Reserved |

FIG. 5C

| | | |
|---|---|---|
| R | Serving Cell ID | BWP ID |
| | R | SRS RE-SOURCE ID |
| | R | SRS RE-SOURCE ID |

FIG. 6A

| R | Serving Cell ID | BWP ID |
|---|---|---|
| | SRS RESOURCE SET ID | |
| R | R | |
| R | SRS RESOURCE ID | |
| R | SRS RESOURCE ID | |

FIG. 6B

| SRS RESOURCE ID | CONFIGURED SRS RESOURCE (IN SRS RESOURCE SET OF USAGE = 'codebook') |
|---|---|
| 0 | SRS RESOURCE CONFIGURED TO nrofSRS-Ports = 1 |
| 1 | SRS RESOURCE CONFIGURED TO nrofSRS-Ports = 2 |
| 2 | SRS RESOURCE CONFIGURED TO nrofSRS-Ports = 4 |
| 3 | Reserved |

FIG. 6C

| R | Serving Cell ID | BWP ID |
|---|---|---|
| | SRS RESOURCE SET ID | |
| R | R | SRS RE-SOURCE ID |
| | | SRS RE-SOURCE ID |

FIG. 7A

| R | Serving Cell ID | BWP ID | $S_0$ |
|---|---|---|---|
| | | | $S_1$ |
| | | | $S_2$ |
| | | | $S_3$ |
| | | | $S_4$ |
| | | | $S_5$ |
| | | | $S_6$ |
| | | | $S_7$ |

FIG. 7B

| R | Serving Cell ID | BWP ID | $S_0$ |
|---|---|---|---|
| | | SRS RESOURCE SET ID | $S_1$ |
| | | | $S_2$ |
| | | | $S_3$ |
| | | | $S_4$ |
| | | | $S_5$ |
| | | | $S_6$ |
| | | | $S_7$ |

TERMINAL AND RADIO COMMUNICATION METHOD

TECHNICAL FIELD

The present disclosure relates to a terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+ (plus), New Radio (NR) or 3GPP Rel. 15 or subsequent releases) are also studied.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) to support codebook-based transmission that uses a precoding matrix.

However, according to previous specifications according to Rel-15 NR, when a UE performs codebook-based transmission by using a plurality of ports, if the UE uses part of codebooks, there is a case where transmission power becomes low (full power transmission cannot be performed) compared to a single port. When, for example, a Power Amplifier (PA) connected with part of antenna ports is not a PA (full rated PA) that can output maximum rated power, there is a risk that it is not possible to perform full power transmission. When it is not possible to perform full power transmission, there is a risk that a coverage decreases, and an increase of a communication throughput is suppressed.

It is therefore one of objects of the present disclosure to provide a terminal and a radio communication method that can appropriately control full power transmission.

Solution to Problem

A terminal according to one aspect of the present disclosure includes: a receiving section that receives configuration information of a Sounding Reference Signal (SRS) resource set including three or more SRS resources having different numbers of SRS ports; and a control section that determines one SRS resource from the three or more SRS resources based on an SRS Resource Index (SRI) field included in downlink control information and having a same size as a size of an SRI field of 3GPP Release 15 New Radio.

Advantageous Effects of Invention

According to one aspect of the present disclosure, it is possible to appropriately control full power transmission.

BRIEF DESCRIPTION OF DRAWINGS

FIG. 4 is a diagram illustrating one example of a correspondence between $N_{ini}$ and an SRI value indicated by DCI.

FIGS. 5A to 5C are diagrams illustrating one example of MAC CEs according to embodiment 2-3.

FIGS. 6A to 6C are diagrams illustrating another example of MAC CEs according to embodiment 2-3.

FIGS. 7A and 7B are diagrams illustrating still another example of MAC CEs according to embodiment 2-3.

DESCRIPTION OF EMBODIMENTS (PUSCH Precoder)

Figure 1:
FIG. 1 is a diagram illustrating one example of an association between a precoder type and a TPMI index.

It is studied for NR that a UE supports at least one of Codebook (CB)-based transmission and Non-Codebook (NCB)-based transmission.

For example, it is studied to decide a precoder (precoding matrix) for at least one of CB-based and NCB-based uplink shared channel (Physical Uplink Shared Channel (PUSCH)) transmission by using at least a Sounding Reference Signal (SRS) Resource Index (SRS Resource Index (SRI)).

In a case of CB-based transmission, the UE may determine a precoder for PUSCH transmission based on, for example, an SRI, a Transmitted Rank Indicator (TM) and a Transmitted Precoding Matrix Indicator (TPMI). In a case of NCB-based transmission, the UE may determine a precoder for PUSCH transmission based on an SRI.

For example, the SRI, the TRI and the TPMI may be notified to the UE by using Downlink Control Information (DCI). The SRI may be indicated by an SRS Resource Indicator field (SRI field) of the DCI, or may be indicated by a parameter "srs-ResourceIndicator" included in an RRC information element "ConfiguredGrantConfig" of a configured grant PUSCH. The TM and the TPMI may be indicated by a "precoding information and number of layers" field of the DCI.

The UE may report UE capability information related to a precoder type, and a base station may configure the precoder type that is based on the UE capability information to the UE by a higher layer signaling. The UE capability information may be information (that may be expressed as an RRC parameter "pusch-TransCoherence") of the precoder type that the UE uses for PUSCH transmission.

In the present disclosure, a higher layer signaling may be one or a combination of, for example, a Radio Resource Control (RRC) signaling, a Medium Access Control (MAC) signaling and broadcast information.

The MAC signaling may use, for example, an MAC Control Element (MAC CE) or an MAC Protocol Data Unit (PDU). The broadcast information may be, for example, a Master Information Block (MIB) and a System Information Block (SIB).

The UE may determine a precoder used for PUSCH transmission based on information (that may be expressed as an RRC parameter "codebookSubset") of a precoder type included in PUSCH configuration information (a "PUSCH-Config" information element of an RRC signaling) notified by a higher layer signaling. A subset of PMIs indicated by TPMIs may be configured to the UE by codebookSubset.

In this regard, the precoder type may be indicated by one or a combination of at least two of fully coherent (full coherent or coherent), partial coherent and non coherent (that may be expressed as parameters such as fully and partial and non coherent (fullyAndPartialAndNonCoherent) and partial and non coherent (partialAndNonCoherent)).

Fully coherent may mean that synchronization between all antenna ports used for transmission is established (which may be expressed as that phases can be matched or that precoders to be applied are the same). Partial coherent may mean that synchronization is established between part of ports of antenna ports used for transmission, yet synchronization cannot be established between the part of ports and other ports. Non coherent may mean that synchronization between each antenna port used for transmission cannot be established.

In addition, it may be assumed that the UE that supports a precoder type of fully coherent supports precoder types of partial coherent and non coherent. It may be assumed that the UE that supports the precoder type of partial coherent supports the precoder type of non coherent.

The precoder type may be read as, for example, coherency, PUSCH transmission coherence, a coherent type, a coherence type, a codebook type, a codebook subset and a codebook subset type.

The UE may determine from a plurality of precoders (that may be referred to as, for example, precoding matrices or codebooks) for CB-based transmission a precoding matrix associated with a TPMI index that can be obtained from DCI for scheduling UL transmission.

FIG. 1 is a diagram illustrating one example of an association between a precoder type and a TPMI index. FIG. 1 corresponds to a table of a precoding matrix W for single layer transmission that uses 4 antenna ports according to Discrete Fourier Transform spread OFDM (DFT-s-OFDM where transform precoding is enabled).

In a case where a precoder type (codebookSubset) is fully and partial and non coherent (fullyAndPartialAndNonCoherent) in FIG. 1, the UE is notified of a TPMI that is one of 0 to 27 for single layer transmission. Furthermore, in a case where a precoder type is partial and non coherent (partialAndNonCoherent), a TPMI that is one of 0 to 11 is configured to the UE for single layer transmission. In a case where a precoder type is non coherent (nonCoherent), a TPMI that is one of 0 to 3 is configured to the UE for single layer transmission.

FIG. 1 illustrates a table that is specified in current Rel-15 NR. According to this table, when transmission power of fully coherent corresponding to indices 12 to 27 is $1(=(1/2)^2*4)$, transmission power of partial coherent corresponding to indices 4 to 11 is $1/2(=(1/2)^2*2)$, and transmission power of non coherent corresponding to indices 0 to 3 is $1/4(=(1/2)^2*1)$.

That is, according to a specification of current Rel-15 NR, when the UE performs codebook-based transmission by using a plurality of ports, if the UE uses part of codebooks, there is a case where transmission power becomes low compared to a single port (full power transmission cannot be performed).

In addition, as illustrated in FIG. 1, a precoding matrix whose only one component of each column is not 0 may be referred to as a non coherent codebook. A precoding matrix whose only given number (not all) of components of each column are not 0 may be referred to as a partial coherent codebook. A precoding matrix whose all components of each column are not 0 may be referred to as a fully coherent codebook.

In addition, according to the present disclosure, the partial coherent codebook may correspond to codebooks (i.e., codebooks of TPMIs=4 to 11 in a case of single layer transmission of 4 antenna ports) except codebooks associated with TPMIs indicated to the UE to which a non coherent codebook subset (e.g., RRC parameter "codebookSubset"="nonCoherent") has been configured among codebooks (precoding matrices) associated with TPMIs indicated by DCI for codebook-based transmission to the UE to which a partial coherent codebook subset (e.g., RRC parameter "codebookSubset"="partialAndNonCoherent") has been configured.

In addition, according to the present disclosure, the fully coherent codebook may correspond to codebooks (i.e., codebooks of TPMIs=12 to 27 in a case of single layer transmission of 4 antenna ports) except codebooks associated with TPMIs indicated to the UE to which a partial coherent codebook subset (e.g., RRC parameter "codebookSubset"="partialAndNonCoherent") has been configured among codebooks (precoding matrices) associated with TPMIs indicated by DCI for codebook-based transmission to the UE to which a fully coherent codebook subset (e.g., RRC parameter "codebookSubset"="fullyAndPartialAndNonCoherent") has been configured.

(UE Capability of Full Power Transmission)

Even when a codebook is used, it is preferable to appropriately perform full power UL transmission. Hence, according to NR, UE capability related to codebook-based full power UL transmission that uses a plurality of Power Amplifiers (PAs)) has been studied. An argument on NR made so far proposes following UE capabilities 1 to 3:

UE capability 1: Each transmission chain (Tx chain) supports (includes) a PA (full rated PA) that can output maximum rated power, UE capability 2: No transmission chain supports the full rated PA, and UE capability 3: A subset (part) of transmission chains support the full rated PAs.

In addition, the UE that has at least one of the UE capabilities 1 to 3 may mean that the UE supports full power of UL transmission. The UE may report capability information that indicates that the UE supports UL full power transmission capability in addition to the UE capabilities 1 to 3 to a network (e.g., base station). The UE may be configured by the network to support full power transmission.

The UE capabilities 1/2/3 may be each read as, for example, the UE capability 1/2/3 related to full power transmission, full power transmission type 1/2/3 and power allocation type 1/2/3. In the present disclosure, for example, the type, the mode and the capability may be interchangeably read. Furthermore, in the present disclosure, 1/2/3 may be read as a set of arbitrary numbers or characters such as AB/C.

Figure 2:
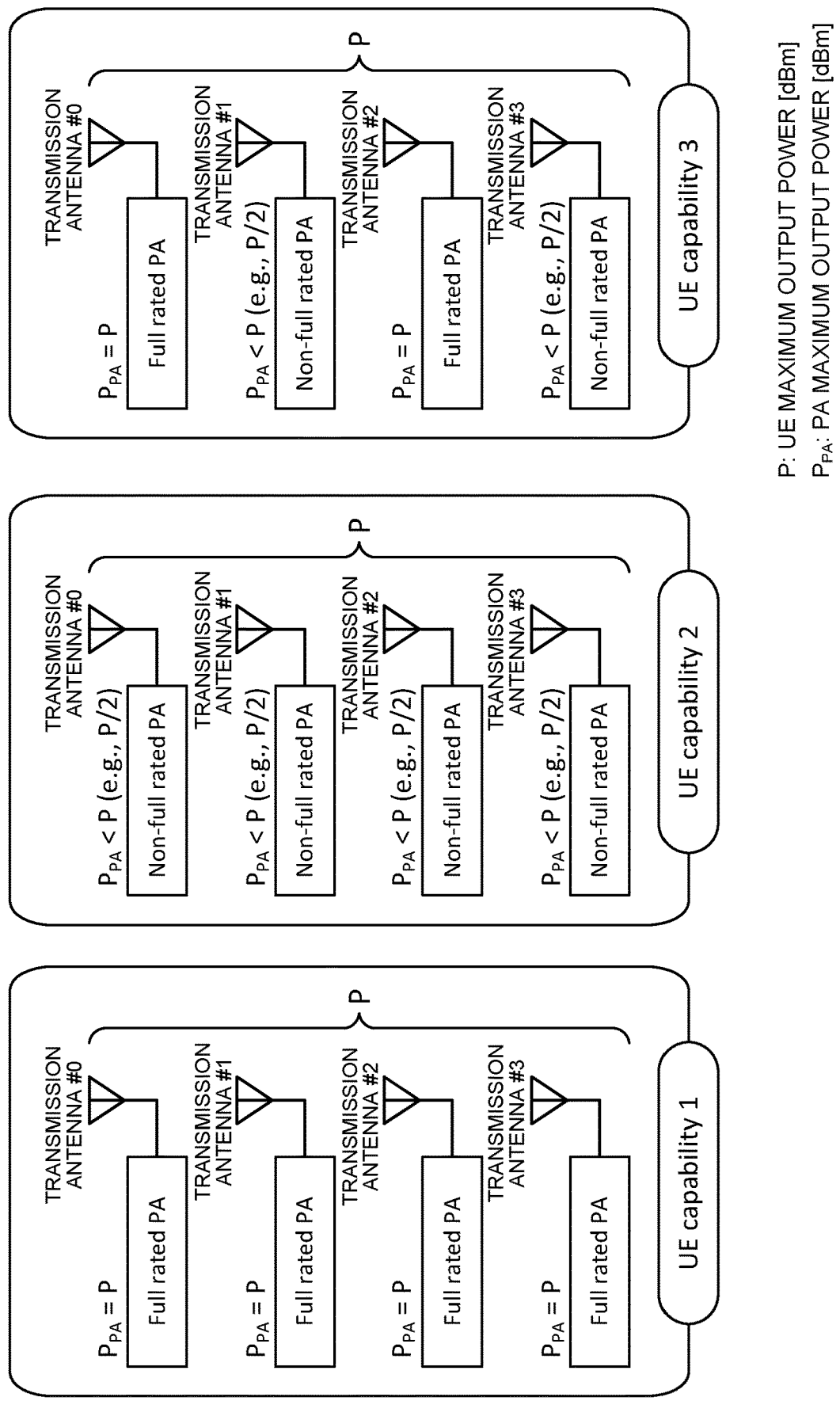
FIG. 2 is a diagram illustrating one example of a UE configuration assumed by UE capabilities 1 to 3 related to full power transmission.

FIG. 2 is a diagram illustrating one example of a UE configuration assumed by the UE capabilities 1 to 3 related to full power transmission. FIG. 2 schematically illustrates only PAs and transmission antenna ports (that may be read as transmission antennas) as a UE configuration. In addition, FIG. 2 illustrates an example where the numbers of the PAs and the transmission antenna ports are each 4. However, the numbers of the PAs and the transmission antenna ports are not limited to this.

In addition, P represents UE maximum output power [dBm], and $P_{PA}$ represents PA maximum output power [dBm]. In addition, P may be, for example, 23 dBm in a case of the UE of power class 3, and 26 dBm in a case of the UE of power class 2. The present disclosure assumes $P_{PA} \leq P$. However, embodiments of the present disclosure may be applied to a case of $P_{PA} > P$.

Although implementation of a configuration of the UE capability 1 is assumed to be costly, the configuration of the UE capability 1 enables full power transmission by using one or more arbitrary antenna ports. A configuration of the UE capability 2 includes only non-full rated PAs, and is expected to be able to be implemented at low cost. However, the configuration of the UE capability 2 does not enable full power transmission by using only one antenna port, and therefore is demanded to control, for example, a phase and an amplitude of a signal to be input to each PA.

The configuration of the UE capability 3 is a middle of the configuration of the UE capability 1 and the configuration of the UE capability 2. The configuration of the UE capability 3 includes antenna ports (transmission antennas #0 and #2 in this example) that can perform full power transmission, and antenna ports (antennas #1 and #3 in this example) that cannot perform full power transmission in a mixed manner.

In addition, indices and the number of antenna ports of the UE capability 3 that can perform full power transmission are not limited to these. Furthermore, this example assumes $P_{PA} = P/2$ of the non-full rated PA. However, the value of $P_{PA}$ is not limited to this.

By the way, it is studied to configure at least one of two modes (modes 1 and 2) of a full power transmission operation to the UE that supports the UE capability 2 or 3. The modes 1 and 2 may be referred to as, for example, operation modes 1 and 2, respectively.

In this regard, the mode 1 may be a mode (that may be referred to as, for example, a first full power transmission mode) that the UE is configured such that one or a plurality of SRS resources included in one SRS resource set whose usage is a "codebook" have the same numbers of SRS ports. The UE that operates in the mode 1 may perform full power transmission by using all antenna ports.

The UE that operates in the mode 1 may be configured by the network to use a subset of TPMIs that connect ports in 1 layer for realizing full power transmission. A new codebook subset may be introduced only to a rank value that includes a TPMI precoder associated with "fullyAndPartialAndNonCoherent" defined by Rel-15 NR and cannot be used for full power transmission.

On the other hand, the mode 2 may be a mode (that may be referred to as, for example, a second full power transmission mode) that the UE is configured such that one or a plurality of SRS resources included in one SRS resource set whose usage is the "codebook" have different numbers of SRS ports. The UE that operates in the mode 2 may perform full power transmission by using part of antenna ports instead of all antenna ports.

The UE that operates in the mode 2 may transmit a PUSCH and an SRS by the same method irrespectively of whether or not antenna virtualization is used. The UE in the mode 2 may be notified to a set of TPMIs for realizing full power transmission to support SRS resources whose numbers of ports is larger than 1. In a case of the mode 2, two or three (two at maximum in a case of Rel-15 NR) SRS resources may be configured per SRS resource set.

Compared to the mode 2, the mode 1 has an advantage that a small necessary SRI field size is sufficient (full power transmission can be performed using 1 SRS resource).

Compared to the mode 1, the mode 2 has an advantage that it is possible to dynamically switch between single port transmission and multi-port transmission by using DCI. Furthermore, it is possible to perform full power transmission at part of antenna ports, so that, for example, it is possible to perform full power transmission by using only antennas including full rated PAs, or perform full power transmission by using only coherent antennas.

By the way, it is studied for Rel-16 NR to configure mainly for the mode 2 an SRS resource set that includes three or more SRS resources and whose usage is a "codebook".

On the other hand, according to Rel-15 NR, an SRS resource set whose usage is a "codebook" merely includes one or two SRS resources, and therefore an SRI field size included in DCI for codebook-based transmission (RRC parameter "txConfig"='codebook') is 1 bit at most. Therefore, in accordance with an SRI of Rel-15, it is not possible to appropriately use three or more SRS resources.

Unless a method for realizing appropriate use is clearly specified, the UE cannot appropriately perform full power transmission. When full power transmission cannot be performed, there is a risk that a coverage decreases, and an increase of a communication throughput is suppressed.

Hence, the inventors of the present disclosure have conceived a control method for appropriately performing full power transmission. According to one aspect of the present disclosure, it is possible to perform UL Multi Input Multi Output (MIMO) transmission at full power, and maintain a cell coverage similar to that of a single antenna. Furthermore, UL MIMO makes it possible to obtain a spatial diversity gain and expect improvement of a throughput. Furthermore, even the UE that does not include full rated PAs can appropriately perform full power transmission.

The embodiments according to the present disclosure will be described in detail below with reference to the drawings. A radio communication method according to each embodiment may be each applied alone or may be applied in combination.

In addition, an "antenna" and an "antenna port" in the following embodiments may be interchangeably read.

In the present disclosure, "full power" may be read as, for example, "power boosting", "maximum power", "enhanced power" and "high power compared to a Rel-15 UE".

Furthermore, according to the present disclosure, that the UE has UE capability X (X=1, 2 and 3) may be interchangeably read as, for example, that the UE reports the UE capability X or that the UE can perform full power transmission by using a configuration of the UE capability X.

According to the present disclosure, that the UE has capability related to coherent (e.g., fully coherent, partial coherent and non coherent) may be interchangeably read as, for example, that the UE reports the capability or that the UE is configured with the coherent.

Furthermore, the non coherent UE, the partial coherent UE and the fully coherent UE may be interchangeably read as a UE that has capability related to non coherent, a UE that has capability related to partial coherent, and a UE that has capability related to fully coherent, respectively.

Furthermore, the non coherent UE, the partial coherent UE and the fully coherent UE may each mean a UE to which "non coherent (nonCoherent)", "partial and non coherent (partialAndNonCoherent)" and "fully and partial and non coherent (fullyAndPartialAndNonCoherent)" codebook subsets are configured by a higher layer. In addition, according to the present disclosure, a codebook subset and a codebook may be interchangeably read.

Furthermore, the non coherent UE, the partial coherent UE and the fully coherent UE may each mean a UE that can perform transmission by using a non coherent codebook, a partial coherent codebook and a fully coherent codebook.

The following embodiments assume cases where the UE is configured with an SRS resource set that includes three or more SRS resources having respectively different numbers of SRS ports and whose usage is a "codebook" (or "non codebook"), yet are not limited to these. Each embodiment may be applied to a case where, for example, the UE is configured with an SRS resource set that includes three or more SRS resources having the same number of SRS ports and whose usage is a "codebook" (or "non codebook").

(Radio Communication Method)

The following embodiments may assume that, in a case where the UE supports the mode 2 or supports both of the modes 1 and 2, an SRS resource set (in other words, an SRS resource set for the mode 2) that includes more than one (e.g., 2 or 3) SRS resource of different numbers of SRS ports and whose usage is a "codebook" is configured.

For example, the UE may report UE capability information that includes information that indicates that the UE supports full power UL transmission and information that indicates that the UE supports the mode 2 to the network. Furthermore, the SRS resource set that includes three or more SRS resources having respectively different numbers of SRS ports and whose usage is a "codebook" may be subsequently configured to the UE by a higher layer signaling.

The UE may assume that, when the SRS resource set including the three or more SRS resources is configured to the UE, one SRS resource of these three or more SRS resources is indicated by the DCI.

Figure 3:
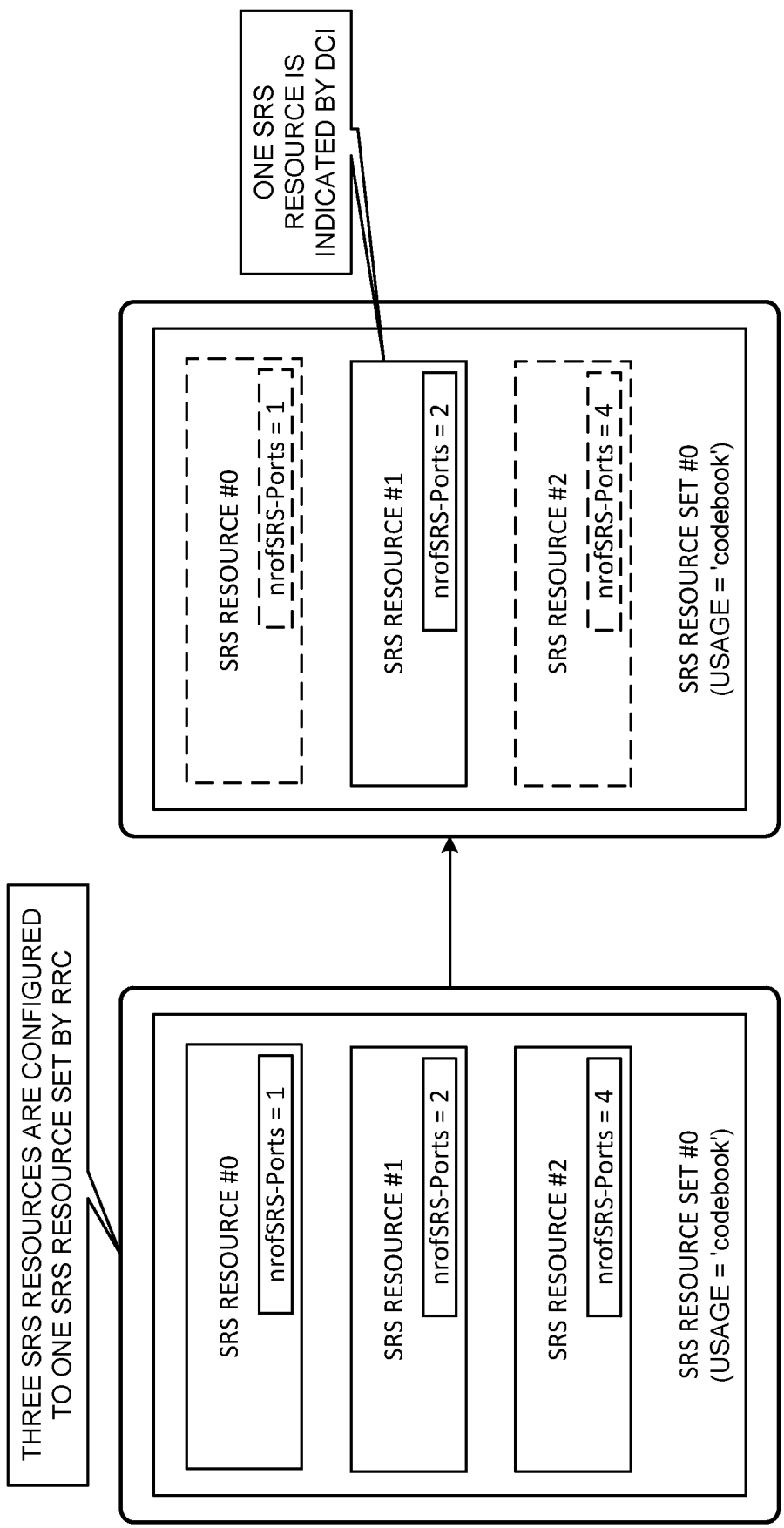
FIG. 3 is a diagram illustrating one example of determination of an SRS resource according to one embodiment.

FIG. 3 is a diagram illustrating one example of determination of an SRS resource according to one embodiment. A left side of FIG. 3 illustrates one SRS resource set (SRS resource set #0) that is configured to the UE by a higher layer signaling and whose usage is a codebook. The SRS resource set #0 includes an SRS resource #0 whose number of SRS ports is 1 (nrofSRS-Ports=1), an SRS resource #1 whose number of SRS ports is 2 (nrofSRS-Ports=2), and an SRS resource #2 whose number of SRS ports is 4 (nrofSRS-Ports=4). That is, the SRS resource set #0 is associated with the mode 2.

A right side of FIG. 3 illustrates an example where, for example, the SRS resource #1 is indicated by DCI. The UE may perform full power PUSCH transmission based on the SRS resource #1.

By configuring one SRS resource set to include three or more SRS resources as illustrated in FIG. 3, it is possible to dynamically switch the numbers of antenna ports (1, 2 and 4 in this example) of all patterns by DCI.

Hereinafter, a method for determining one of three or more SRS resources will be more specifically described below.

The first embodiment relates to a method for deciding an SRS by using an SRI field that is enhanced to a size larger than that of an SRI field of Rel-15 NR.

The second embodiment relates to a method for deciding an SRS by using an SRI field that has the same size as that of the SRI field of Rel-15 NR.

In addition, each embodiment will describe an SRS resource set whose usage is a codebook, yet is not limited to this. Description of each embodiment may be read as, for example, determination of SRS resources for an SRS resource set whose usage is a non codebook.

In addition, according to Rel-15 NR, an SRI field size is 1 bit at maximum in a case where codebook-based transmission (RRC parameter "txConfig"='codebook') is configured, and 2 bits at maximum in a case where non codebook-based transmission (RRC parameter "txConfig"='nonCodebook') is configured. In a case where the embodiments are read based on SRS resource sets whose usage is a non codebook, a person skilled in the art appropriately understands that the number of bits of an SRI field of Rel-15 NR is 2.

First Embodiment

According to the first embodiment, a UE assumes that a size of an SRI field is larger than that of an SRI field of Rel-15 NR.

The UE to which codebook-based transmission (RRC parameter "txConfig"='codebook') has been configured may decide that the SRI field size included in DCI is X bits (e.g., X=2) larger than existing 1 bit.

The UE to which non codebook-based transmission (RRC parameter "txConfig"='codebook') has been configured may decide that the SRI field size included in the DCI is Y bits (e.g., Y=3) larger than existing 2 bits.

A value of this X may be decided based on the number of SRS resources included in an SRS resource set whose usage is a codebook, may be configured by a higher layer signaling, or may be defined in advance by a specification.

A value of this Y may be decided based on the number of SRS resources included in an SRS resource set whose usage is a non codebook, may be configured by a higher layer signaling, or may be defined in advance by the specification.

The UE may determine an SRS resource based on an SRI field value. The SRI field value may directly indicate an SRS resource index, or the SRS resource index may be derived from the SRI field value based on a given correspondence.

According to the above-described first embodiment, the UE can suitably determine one SRS resource of an SRS resource set including three or more SRS resources by using an SRI field having a size larger than that of an SRI field of Rel-15 NR.

Second Embodiment

According to the second embodiment, a UE assumes that a size of an SRI field is the same as that of an SRI field of Rel-15 NR or is not larger than that of the SRI field of Rel-15.

Embodiment 2-1

The UE may assume whether or not received DCI includes an SRI field, and assume based on a value of the SRI field when the DCI includes the SRI field that a specific SRS resource has been indicated.

For example, the UE may assume that, when the received DCI does not include an SRI field, an SRS resource associated with a first number of SRS ports (e.g., higher layer parameter "nrofSRS-Ports"=1) has been indicated.

The UE may assume that, when the received DCI indicates SRI=0, an SRS resource associated with a second number of SRS ports (e.g., higher layer parameter "nrofSRS-Ports"=2) has been indicated.

The UE may assume that, when the received DCI indicates SRI=1, an SRS resource associated with a third number of SRS ports (e.g., higher layer parameter "nrofSRS-Ports"=4) has been indicated.

That is, in embodiment 2-1, no SRI field, SRI field=0 and SRI field=1 are respectively associated with different SRS resources (e.g., SRS resources associated with different numbers of SRS ports).

In this regard, to perform processing according to embodiment 2-1, the UE is required to perform decoding that assumes that a DCI format that may include an SRI field does not include the SRI field, and decoding that assumes that the DCI format includes the SRI field (that is, the UE needs to perform blind-decoding twice per DCI).

According to Rel-15 NR, the number of PDCCH candidates (RRC parameter "nrofCandidates") that is zero to eight is each configured for each aggregation level (e.g., aggregation levels 1, 2, 4, 8 and 16) to the UE per search space set. On the other hand, according to Rel-15 NR, a maximum number of PDCCH candidates $M_{PDCCH}^{max,\ slot,\ \mu}$ per slot of a BWP of 1 serving cell is specified per SubCarrier Spacing (SCS) by the specification, and is 44, 36, 22 and 20 in a case of, SCS=15, 30, 60 and 120 kHz, respectively.

When the number of times of detection of PDCCH candidates per slot exceeds $M_{PDCCH}^{max,\ slot,\ \mu}$ due to processing according to embodiment 2-1, the UE may not monitor (detect) specific PDCCH candidates. When, for example, the number of times of detection of PDCCH candidates per slot exceeds $M_{PDCCH}^{max,\ slot,\ \mu}$ the UE may reduce the number of times of detection of PDCCH candidates in order from a higher aggregation level (e.g., aggregation level 16, 8, . . . ) or in order from a lower aggregation level.

Embodiment 2-2

An initial value (that may be referred to as, for example, $N_{ini}$) of the number of SRS ports associated with SRS resources may be configured to the UE by a higher layer signaling. The UE may assume that $N_{ini}$ corresponds to the number of SRS ports associated with a given SRS resource (e.g., an SRS resource of a lowest SRS resource index) included in an SRS resource set, or $N_{ini}$ is separately configured by a higher layer parameter.

The UE may determine the number of SRS ports based on $N_{ini}$ and a value of an SRI indicated by DCI, and assume that an SRS resource associated with the determined number of SRS ports has been indicated.

FIG. 4 is a diagram illustrating one example of a correspondence between $N_{ini}$ and a value of an SRI indicated by DCI. For example, the UE to which $N_{ini}$=1 has been configured may assume that, when the received DCI indicates SRI=0, an SRS resource of the number of SRS ports=2 has been indicated, and, when the received DCI indicates SRI=1, an SRS resource of the number of SRS ports=4 has been indicated.

Furthermore, the UE to which $N_{ini}$=2 has been configured may assume that an SRS resource of the number of SRS ports=1 in a case of SRI=0 and an SRS resource of the number of SRS ports=4 in a case of SRI=1 has been indicated.

Furthermore, the UE to which $N_{ini}$=4 has been configured may assume that an SRS resource of the number of SRS ports=1 in a case of SRI=0 and an SRS resource of the number of SRS ports=2 in a case of SRI=1 has been indicated.

In addition, the correspondence in FIG. 4 is merely an example, and is not limited to this. This correspondence may be configured based on a higher layer parameter, or may be defined in advance by the specification.

In embodiment 2-2, the UE may assume that DCI for scheduling PUSCH transmission that uses an SRS resource set including three or more SRS resources includes an SRI field at all times.

In embodiment 2-2, the UE may assume that DCI for scheduling PUSCH transmission that uses an SRS resource set including three or more SRS resources may not include an SRI field. In a case where the received DCI does not include an SRI field, the UE may assume that a latest SRS resource (e.g., an SRS resource used for latest UL transmission) has been indicated, or an SRS resource having the number of SRS ports associated with has been indicated.

In addition, in a case where the number of times of monitoring of PDCCH candidates exceeds $M_{PDCCH}^{max,\ slot,\ \mu}$ the number of times of monitoring may be reduced similar to embodiment 2-1.

Embodiment 2-3

The UE to which an SRS resource set including three or more (in other words, more than two) SRS resources has been configured by an RRC signaling may activate up to two SRS resources relative to one SRS resource set by using an MAC CE.

The UE may determine one SRS resource based on an SRI field included in DCI from up to the two activated SRS resources.

The above MAC CE may indicate an SRS resource ID to be activated or deactivated. The MAC CE may be referred to as, for example, an SRS resource Activation/Deactivation MAC CE.

FIGS. 5A to 5C are diagrams illustrating one example of MAC CEs according to embodiment 2-3. FIGS. 5A and 5C illustrate bit sequences that make up the MAC CEs, and the bit sequences are expressed by three octets in total (8 bits×3=24 bits) of octets (Octs) 1 to 3 illustrated therein. In this regard, the number of bits of the MAC CE is not limited to this.

The MAC CE may include information of, for example, an application target serving cell ID ("Serving Cell ID" field), a BWP ID ("BWP ID" field) and two SRS resource ID fields. Furthermore, the MAC CE may include a reservation ("R") field, and this reservation field may mean reserved bits for future enhancement.

In a case of FIG. 5A, the SRS resource ID field may indicate, for example, one of SRS resource IDs included in a higher layer parameter "srs-ResourceIdList". When a maximum number of SRS resources is 64, 6 bits are necessary for the SRS resource ID field.

On the other hand, the SRS resource ID field of the MAC CE in FIG. 5C is expressed by 2 bits. This field value may indicate an SRS resource associated with the number of SRS ports as illustrated in FIG. 5B. According to FIG. 5B, for example, SRS resource ID field={10} (that is 2 as a value) may indicate an SRS resource whose number of SRS ports is configured to 4.

FIGS. 6A to 6C are diagrams illustrating another example of MAC CEs according to embodiment 2-3. FIGS. 6A to 6C are similar to FIGS. 5A to 5C, respectively, and therefore overlapping description thereof will not be repeated.

The MAC CEs in FIGS. 6A and 6C include SRS resource set ID fields. The SRS resource set ID field may indicate, for example, one of SRS resource set IDs included in a higher layer parameter "srs-ResourceSetIdList". According to the MAC CE, even when a plurality of SRS resource sets whose usage is a codebook are configured, it is possible to distinguish these SRS resource sets and activate an SRS resource.

FIGS. 7A and 7B are diagrams illustrating still another example of MAC CEs according to embodiment 2-3. Fields other than a field of "$S_i$" (e.g., i=0 to 7) in FIGS. 7A and 7B are similar to those of the above-described MAC CE, and therefore overlapping description thereof will not be repeated. FIGS. 7A and 7B differ in whether or not an SRS resource set ID field is included.

When a certain $S_i$ field indicates 1, the UE may decide that an SRS resource associated with a specific number of SRS ports has been activated. For example, $S_i$ (i=0 to 7) may indicate a resource of the number of SRS ports=$2^i$. In this case, $\{S_7S_6S_5S_4S_3S_2S_1S_0\}=\{00000011\}$ may mean that an SRS resource of the number of SRS ports=1 and an SRS resource of the number of SRS ports=2 are activated. Furthermore, $\{S_7S_6S_5S_4S_3S_2S_1S_0\}=\{00000110\}$ may mean that an SRS resource of the number of SRS ports=2 and an SRS resource of the number of SRS ports=4 are activated.

In addition, the correspondence between the $S_i$ field and the number of SRS ports may be configured based on a higher layer parameter, or may be defined in advance by the specification.

In addition, the $S_i$ field may mean that an SRS resource of an SRS resource ID=i is activated. Furthermore, the number of $S_i$ included in the MAC CE is not limited to 8, and may be, for example, 16, 32 or 64.

Figures 8A, 8B:
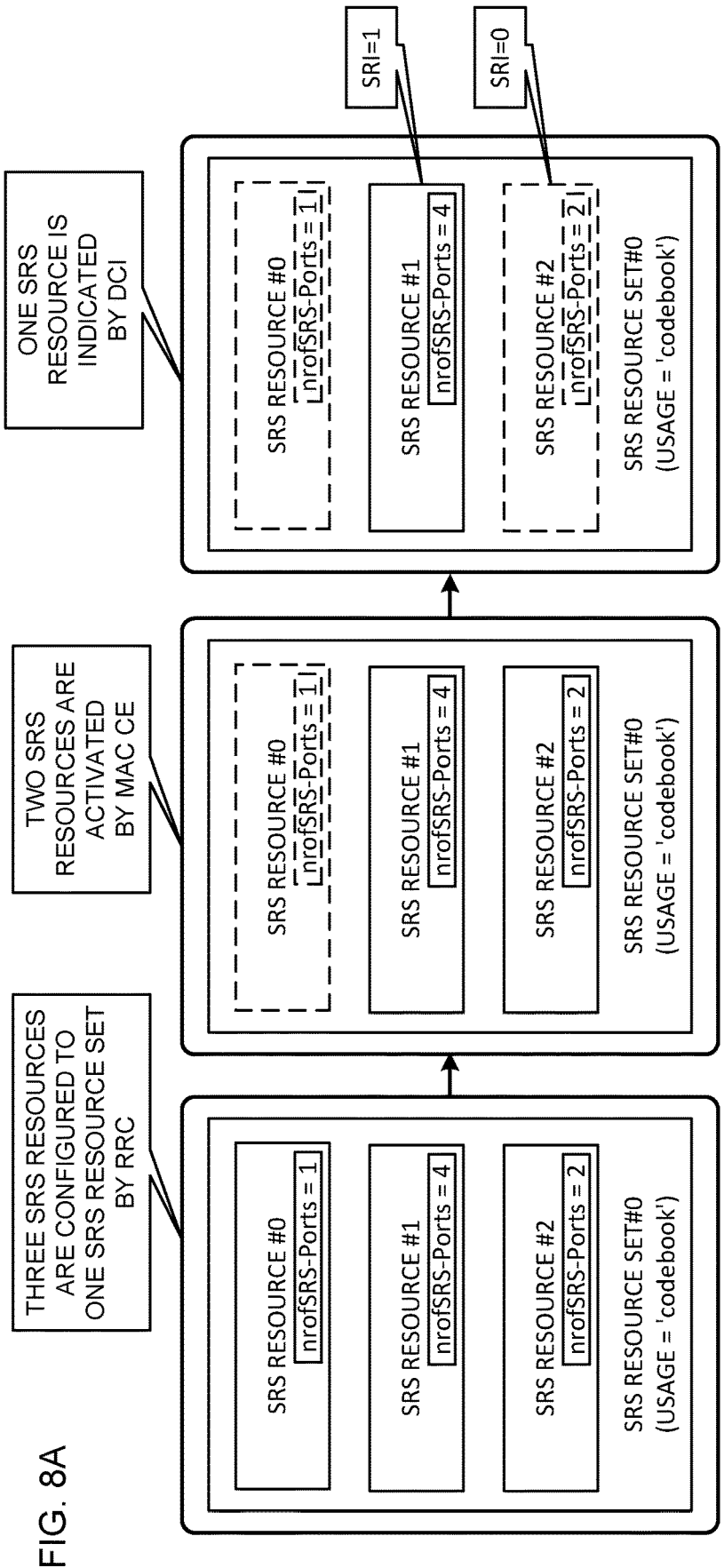
FIGS. 8A and 8B are diagrams illustrating one example of determination of an SRS resource according to embodiment 2-3.

FIGS. 8A and 8B are diagrams illustrating one example of determination of an SRS resource according to embodiment 2-3. A left side of FIG. 8A illustrates one SRS resource set (SRS resource set #0) that is configured to the UE by a higher layer signaling and whose usage is a codebook. The SRS resource set #0 includes an SRS resource #0 whose number of SRS ports is 1 (nrofSRS-Ports=1), an SRS resource #1 whose number of SRS ports is 4 (nrofSRS-Ports=4), and an SRS resource #2 whose number of SRS ports is 2 (nrofSRS-Ports=2). That is, the SRS resource set #0 is associated with a mode 2.

A center of FIG. 8A illustrates an example where the SRS resources #1 and #2 are activated by the above-described MAC CE.

When receiving DCI, the UE determines one SRS resource based on an SRI field value. FIG. 8B illustrates one example of an SRS resource associated with an SRI field value. The SRI field may indicate an SRS resource associated with the number of SRS ports as illustrated in FIG. 8B.

The UE may assume an SRS resource associated with a smaller (or larger) number of SRS ports among two activated SRS resources in a case of SRI=0, and an SRS resource associated with a larger (or smaller) number of SRS ports among two activated SRS resources in a case of SRI=1. According to FIG. 8B, for example, SRS resource ID field=1 may indicate an SRS resource whose number of SRS ports is configured to 4.

A right side of FIG. 8A illustrates an example where the SRS resource #1 is indicated by SRI=1 of DCI. The UE may perform full power PUSCH transmission based on the SRS resource #1.

Figures 9A, 9B:
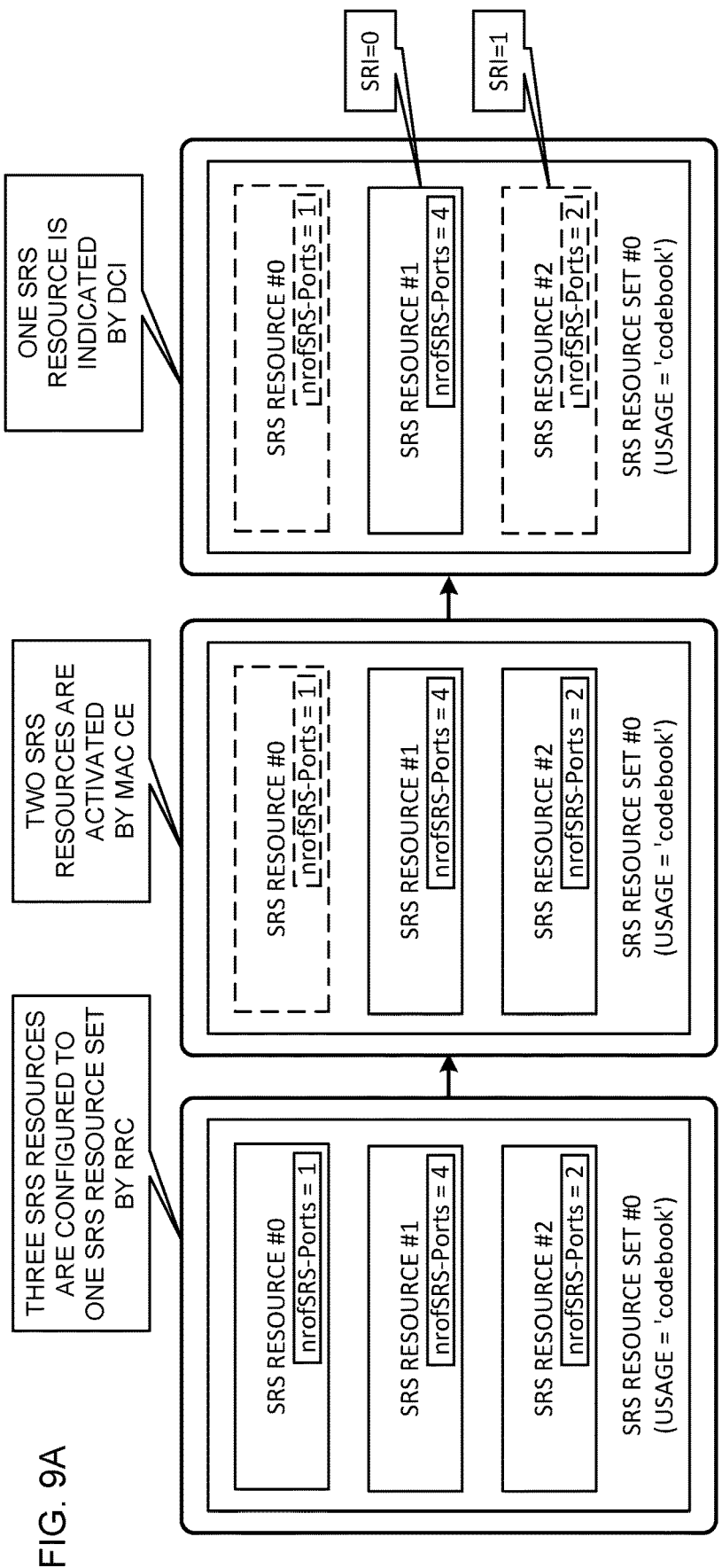
FIGS. 9A and 9B are diagrams illustrating another example of determination of an SRS resource according to embodiment 2-3.

FIGS. 9A and 9B are diagrams illustrating another example of determination of an SRS resource according to embodiment 2-3. Description of FIG. 9A regarding up to activation of an MAC CE is the same as that of FIG. 8A, and therefore overlapping description thereof will not be repeated.

When receiving DCI, the UE determines one SRS resource based on an SRI field value. FIG. 9B illustrates one example of an SRS resource associated with an SRI field value. The SRI field may indicate an SRS resource associated with an SRS resource ID as illustrated in FIG. 9B.

The UE may assume an SRS resource associated with a smaller (or larger) SRS resource ID among two activated SRS resources in a case of SRI=0, and an SRS resource associated with a larger (or smaller) SRS resource ID among two activated SRS resources in a case of SRI=1.

A right side of FIG. 9A illustrates an example where the SRS resource #1 of the smaller resource ID is indicated by SRI=0 of DCI. The UE may perform full power PUSCH transmission based on the SRS resource #1.

According to the above-described second embodiment, the UE can suitably determine one SRS resource of an SRS resource set including three or more SRS resources by using an SRI field having the same size as that of an SRI field of Rel-15 NR.

<Others>

The above-described embodiments have been described assuming the two modes, yet are not limited to this. For example, three or more modes may be defined.

Furthermore, each of the above-described embodiments has described UL transmission that uses an antenna port assuming a PUSCH. However, full power transmission of at least one of another signal and channel may be controlled in addition to a PUSCH or instead of a PUSCH.

That is, the antenna port according to each of the above-described embodiments may be an antenna port of at least one of, for example, a PUSCH (or a DeModulation Reference Signal (DMRS) for the PUSCH), a Phase Tracking Reference Signal (PTRS), a Physical Uplink Control Channel (PUCCH), a Physical Random Access Channel (PRACH) and an SRS, and full power transmission may be applied to at least one of these signals and channels.

(Radio Communication System)

The configuration of the radio communication system according to one embodiment of the present disclosure will be described below. This radio communication system uses one or a combination of the radio communication method according to each of the above embodiments of the present disclosure to perform communication.

Figure 10:
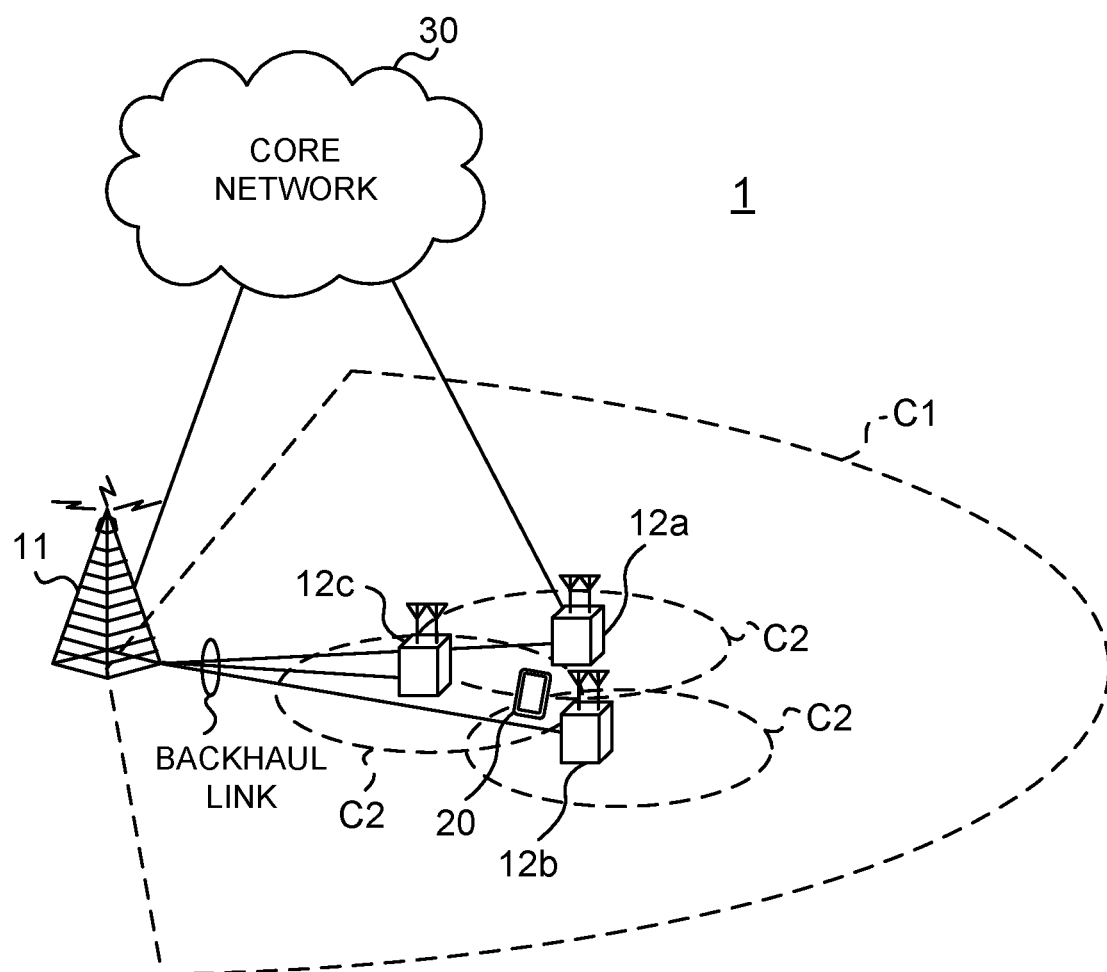
FIG. 10 is a diagram illustrating one example of a schematic configuration of a radio communication system according to one embodiment.

FIG. 10 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 may include a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 10. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR 1)) and a second frequency range (Frequency Range 2 (FR 2)). The macro cell C1 may be included in the FR 1, and the small cell C2 may be included in the FR 2. For example, the FR 1 may be a frequency range equal to or less than 6 GHz (sub-6 GHz), and the FR 2 may be a frequency range higher than 24 GHz (above-24 GHz). In addition, the frequency ranges and definitions of the FR 1 and the FR 2 are not limited to these, and, for example, the FR 1 may correspond to a frequency range higher than the FR 2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 11:
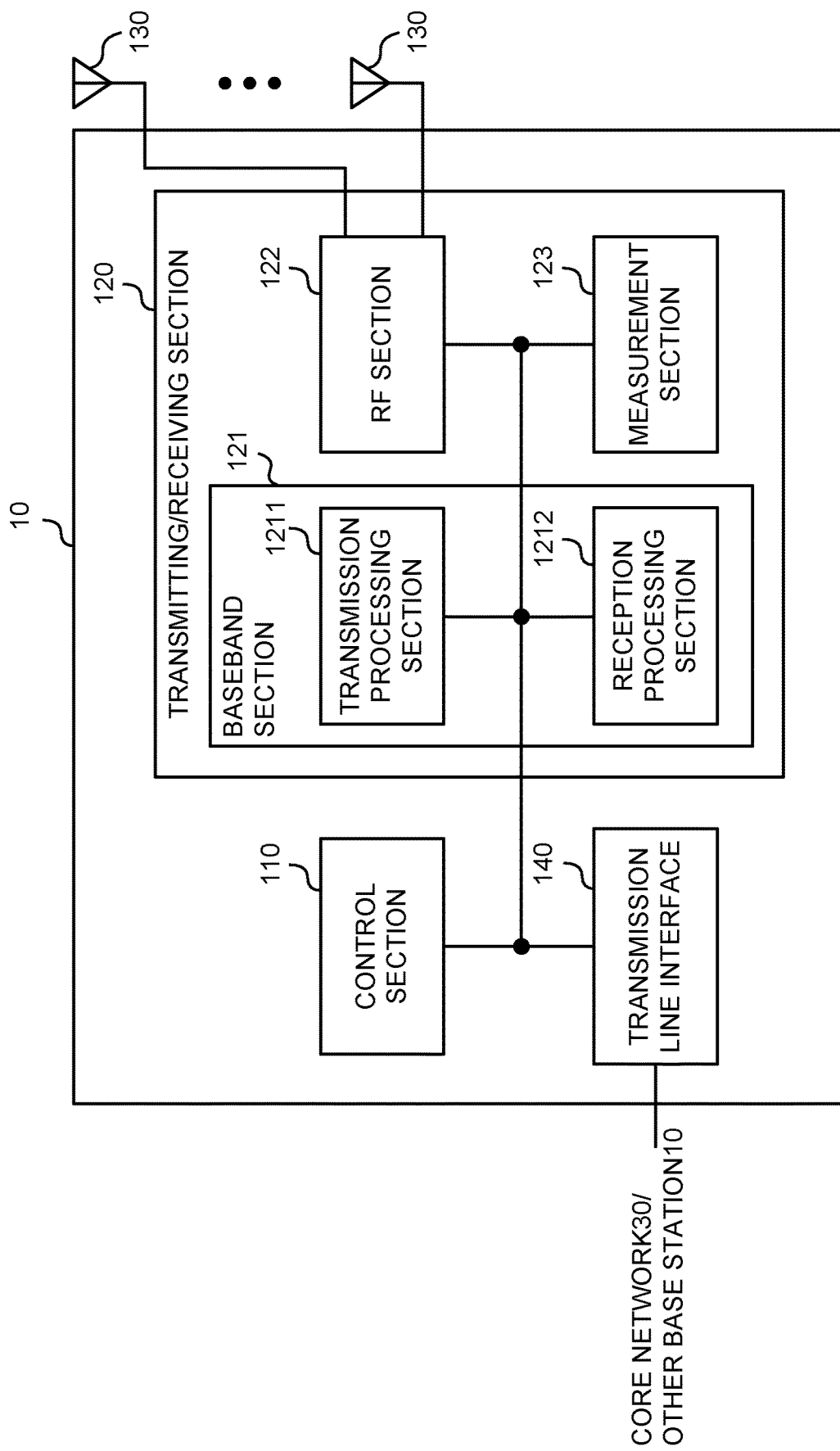
FIG. 11 is a diagram illustrating one example of a configuration of a base station according to the one embodiment.

FIG. 11 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120, the transmission/reception antenna 130 and the transmission line interface 140.

In addition, the transmitting/receiving section 120 may transmit configuration information of an SRS resource set including three or more SRS resources having different numbers of Sounding Reference Signal (SRS) ports to the user terminal 20.

(User Terminal)

Figure 12:
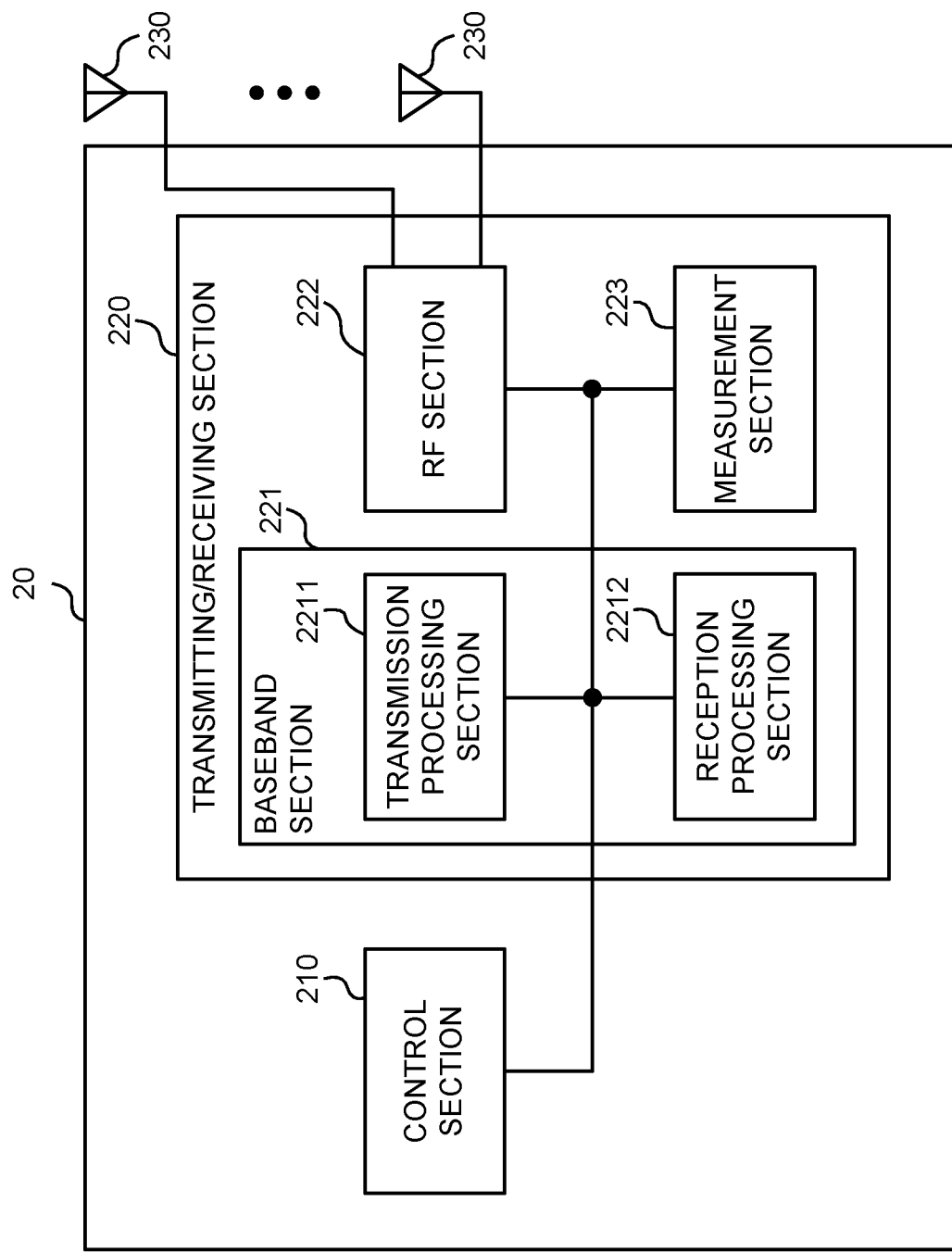
FIG. 12 is a diagram illustrating one example of a configuration of a user terminal according to the one embodiment.

FIG. 12 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220 and the transmission/reception antenna 230.

In addition, the transmitting/receiving section 220 may receive the configuration information of the Sounding Reference Signal (SRS) resource set including the three or more SRS resources having different numbers of SRS ports.

The control section 210 may determine one SRS resource from the three or more SRS resources based on an SRS Resource Index (SRI or SRS Resource Indicator (SRI)) field included in Downlink Control Information (DCI), and having the same size (that is, for example, 1 bit in a case of codebook-based transmission and 2 bits in a case of non codebook-based transmission) as that of an SRI field of 3GPP Release 15 New Radio.

The control section 210 may determine the one SRS resource from the three or more SRS resources based on whether or not the downlink control information includes the SRI field (whether the SRI field is 0 bit or x (e.g., x=1) bits, and, in a case of the x bits, a value of the x bits).

The control section 210 may determine the number of SRS ports based on an initial value ($N_{ini}$) related to the number of SRS ports and the SRI field, and determine an SRS resource associated with the determined number of SRS ports as the one SRS resource.

The control section 210 may determine the one SRS resource from up to SRS resources activated by an MAC CE among the three or more SRS resources based on the SRI field.

(Hardware Configuration)

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 13:
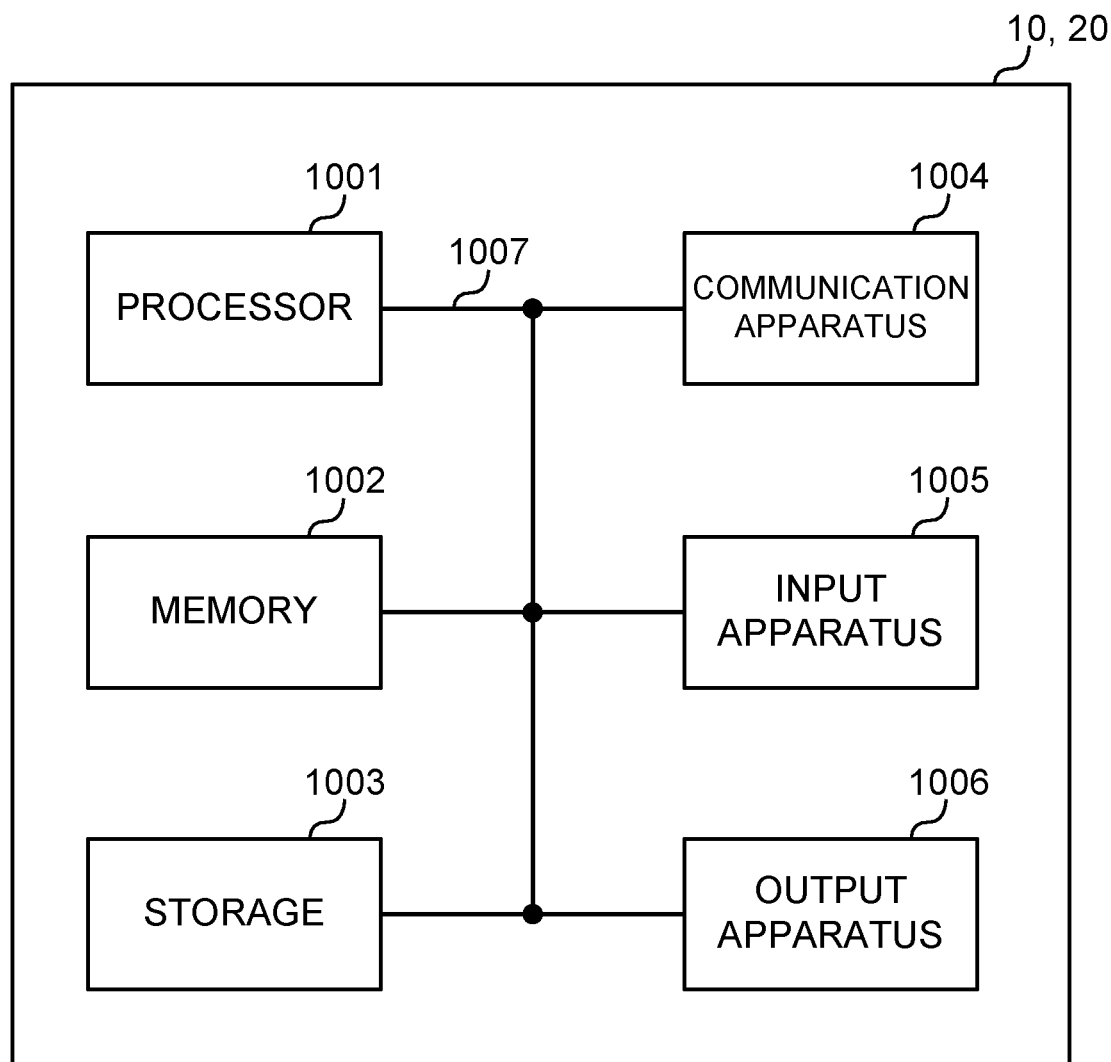
FIG. 13 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 13 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 13 or may be configured without including part of the apparatuses.

For example, FIG. 13 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by 1 or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a subslot. The mini slot may include a smaller number of symbols than that of the slot. The PDSCH (or the PUSCH) to be transmitted in larger time units than that of the mini slot may be referred to as a PDSCH (PUSCH) mapping type A. The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or code word, or may be a processing unit of scheduling or link adaptation. In addition, when the TTI is given, a time period (e.g., the number of symbols) in which a transport block, a code block or a code word is actually mapped may be shorter than the TTI.

In addition, in a case where 1 slot or 1 mini slot is referred to as a TTI, 1 or more TTIs (i.e., 1 or more slots or 1 or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (such as the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (Remote Radio Head (RRH))). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a moving object or the moving object itself. The moving object may be a vehicle (e.g., a car or an airplane), may be a moving object (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMEs) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM (registered trademark)), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that 1 or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using 1 or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

In a case where the words "include" and "including" and modifications of these words are used in the present disclosure, these words intend to be comprehensive similar to the word "comprising". Furthermore, the word "or" used in the present disclosure intends to not be an exclusive OR.

In a case where, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
    a receiver that receives configuration information of a sounding reference signal (SRS) resource set used for a codebook-based transmission, the SRS resource set including three or more SRS resources with a different number of SRS ports; and
    a processor that, when a codebook-based transmission and a full power transmission mode 2 are configured, determines one of the three or more SRS resources based on 2-bit SRS resource index (SRI) field included in downlink control information.

2. A base station comprising:
    a transmitter that transmits configuration information of a sounding reference signal (SRS) resource set used for a codebook-based transmission, the SRS resource set including three or more SRS resources with a different number of SRS ports; and
    a processor that, when a codebook-based transmission and a full power transmission mode 2 are configured for a terminal, controls to transmit downlink control information including 2-bit SRS resource index (SRI) field indicating one of the three or more SRS resources.

3. A radio communication method for a terminal, comprising:
    receiving configuration information of a sounding reference signal (SRS) resource set used for a codebook-based transmission, the SRS resource set including three or more SRS resources with a different number of SRS ports; and
    when a codebook-based transmission and a full power transmission mode 2 are configured, determining one of the three or more SRS resources based on 2-bit SRS resource index (SRI) field included in downlink control information.

4. A system comprising a terminal and a base station, wherein
    the terminal comprises:
        a receiver that receives configuration information of a sounding reference signal (SRS) resource set used for a codebook-based transmission, the SRS resource set including three or more SRS resources with a different number of SRS ports; and
        a processor that, when a codebook-based transmission and a full power transmission mode 2 are configured, determines one of the three or more SRS resources based on 2-bit SRS resource index (SRI) field included in downlink control information, and
    the base station comprises:
        a transmitter that transmits the configuration information.

5. The terminal according to claim 1, wherein the processor further determines one SRS resource among the three or more SRS resources that is activated by MAC CE.

6. The terminal according to claim 1, wherein the full power transmission mode 2 is a mode in which one or a plurality of SRS resources in one SRS resource set that is used as a codebook are configured in the terminal to have different numbers of SRS ports.

* * * * *